Patented Oct. 31, 1939

2,178,349

UNITED STATES PATENT OFFICE 2,178,349

METHOD FOR THE PRODUCTION OF TERPINEOL FROM PINENE

Donald H. Sheffield, Brunswick, Ga., assignor to Hercules Powder Company, Wilmington, Del., a corporation of Delaware No Drawing. Application October 6, 1937, Serial No. 167,674

20 Claims. (Cl. 260—630)

This invention relates to a method for the production of terpineol from pinene and pinene-containing fractions such as turpentine.

Terpineol has heretofore been produced from pinene by methods involving the treatment of pinene with both mineral and organic acids, either used together or separately. Sulfuric acid, for example, of various concentrations, simultaneously isomerizes and hydrates pinene to form terpineol, terpinene, terpinolene and terpin hydrate. Phosphoric acid has been used in a similar manner but both this acid and sulfuric acid, when used in water solution, give very low yields of terpineol because after these alcohols are formed, they are further hydrated, in the presence of these aqueous acids, to terpin hydrate. In other words, the reaction cannot be stopped at the intermediate stage of hydration represented by terpineol.

The hydration of pinene to produce terpineol has also been carried out with organic acids, such as, for example, acetic acid and formic acid, usually in conjunction with sulfuric acid or phosphoric acid. However, the terpinyl acetate or terpinyl formate formed, even if in only minor percentages, are undesirable by-products, and the elimination of these esters by saponification to the desired terpineol is expensive and therefore the general process is not considered as commercially desirable.

Now, in accordance with this invention there is provided a process whereby terpineol may be produced from pinene by the hydration thereof with dilute acid catalysts in the presence of a mutual non-reactive organic solvent. The method in accordance with this invention produces good yields of a high quality terpineol and the simplicity of procedure, according to this invention, obviates the difficulties encountered in the prior processes.

More particularly the method in accordance with this invention involves the treatment of pinene, such as, for example, alpha pinene, with a dilute aqueous polybasic, non-carboxylic acid or a monoaryl or a monoalkyl derivative thereof, in the presence of a mutual non-reactive organic solvent, that is a substance soluble in both the dilute aqueous acid and the pinene either infinitely or partially and which is non-reactive with either the pinene or the dilute aqueous acid under the reaction conditions employed.

The general procedure in carrying out the method in accordance with this invention involves, desirably, the agitation of pinene with a solution of a dilute aqueous polybasic noncarboxylic acid or a monoaryl or a monoalkyl derivative thereof such as sulfuric acid, benzene sulfonic acid, ethyl sulfuric acid, etc., and an organic solvent, such as acetone, dioxan, etc., partially or wholly miscible in both the said acid and the pinene and during this treatment maintaining the temperature below about 60° C.

After completion, or substantial completion of the reaction between the pinene and the dilute aqueous acid, in the presence of a mutual non-reactive solvent, agitation is stopped and the reaction mass allowed to separate into two layers. The lower acid layer, containing also some of the non-reactive solvent, is drained off and re-used in the treatment of further quantities of pinene. The oily layer remaining, is washed with water to remove a portion of the dissolved acid and solvent, which is then added to the acid portion drawn off. The oils are then neutralized with an alkaline solution and without removal of the alkaline solution, the mixture is fractionated to recover the dissolved solvent.

After recovering the acid and the non-reactive solvent in the manner above specified, the alkaline water remaining is drained from the oils, and said oils are then fractionated for the recovery of terpineol.

It has been found that it is desirable to have the boiling points of the solvents sufficiently far removed from the oily constituents of the reaction mass to permit easy separation therefrom by fractional distillation. Especially suitable as solvents, in the method according to this invention, are acetone, dioxan, diethyl ketone, and methyl ethyl ketone.

In general, the polybasic non-carboxylic acids and the monoaryl or monoalkyl derivatives thereof are suitable for the method in accordance with this invention. Among those tried successfully were: sulfuric acid, phosphoric acid, benzene sulfonic acid, toluene sulfonic acid, xylene sulfonic acid, methyl sulfuric acid and ethyl sulfuric acid.

The reaction temperatures in accordance with this invention may vary quite widely, the practical temperature depending largely on the concentration of the dilute acid used. In general the minimum temperature desirable is about 25° C. while the maximum is about 60° C. It has been found that low temperatures are conducive to terpin hydrate formation as well as slow reaction, while high temperatures, although producing a rapid reaction, generally result in high yields of hydrocarbons and cineol at the expense of the terpineol yield. Furthermore, to hold the system in a given temperature range, heat must be removed therefrom, because of the exothermic nature of the reaction. The optimum temperature range for proceeding in accordance with this invention is about 35° C. to about 45° C.

The acid concentrations allowable in accordance with this invention, will also very rather widely. For example, an acid concentration of 25% will react at the upper temperatures, that is above 45° C., but the yield of terpineol will be low. Similarly, an acid concentration of 45% will react at the lower temperatures, that is below 35° C., but the yield of terpineol will only be moderate. The optimum acid concentration for the highest yields of terpineol has been found to be from about 30% to about 35% when operating in the preferred temperature range of about 35° C. to about 45° C.

The amount of the mutual non-reactive solvent present in the system may be varied very widely, the maximum amount depending on the processing equipment used. In other words, the amount of the reactive solvent should not be so large that the capacity of the equipment is decreased by occupancy of the non-reactive solvent. When operating, for example, with acetone as the non-reactive solvent, as low as 5% of the dilute acid by weight may be used although when present in an amount less than about 15% by weight there is a very noticeable increase in the yield of terpin hydrate and consequent decrease of the terpineol yield. In order to obtain the highest yields of terpineol, without a large excess of non-reactive solvent, it has been found that the quantity of acetone should be from about 50% to about 150% by weight of the dilute acid, although it will be understood from the above that I am not limited thereto.

The quantity of dilute acid used relative to the amount of pinene or turpentine processed is not a critical factor in this process, being important only from a control viewpoint. During the hydration of pinene or turpentine, water is removed from the acid, the latter being thus concentrated and, unless a system is devised whereby the water is added to the reaction mixture at the rate at which it is removed, which is a somewhat difficult procedure, the quantity of dilute acid present must be sufficiently large to allow removal of water without greatly changing the acid concentration. It has been found, in accordance with this invention, that the quantity of dilute acid present in the reaction mixture is preferably about 75% by weight of the turpentine or pinene processed but it will be understood that the invention as contemplated herein is not restricted thereto because water can be added to lesser amounts, during the reaction, if suitable controlling features are utilized.

Having now described in a general way the nature and purpose of this invention, I will now proceed to a detailed disclosure thereof with reference to various examples of the practical adaptation of the invention to the production of terpineol from pinene or turpentine.

Unless otherwise stated all parts shown are parts by weight.

As illustrative of the production of terpineol from turpentine, for example, there are added 800 parts of 32% to 1000 parts of turpentine, 800 parts of 32% sulfuric acid and 500 parts of acetone. The reagents are agitated and suitably cooled to maintain the temperature from about 40° C. to about 45° C. for a period of about nine hours, at the end of which time no further rise in the specific gravity of the oil layer is found. The acid layer is then permitted to separate as a lower layer and then drained from the oil reaction product.

After drawing off the separated acid portion, the oils are washed with 50 parts of water to remove a portion of the dissolved acid and acetone, the washing being added to the acid portion already recovered, which may then be re-used in ensuing hydrations. The oils are then neutralized with 250 parts by volume of a 10% sodium carbonate solution, and then without separation of the alkaline wash, the mixture is fractionally distilled in order to recover the acetone. After recovery of the acetone in this manner, the alkaline water is drained from the oils and the reaction product is fractionally distilled, yielding the following fractions:

| | | Parts | Percent |
|---|---|---|---|
| 1 | Unreacted turpentine | 128 | 12.8 |
| 2 | Dipentene, terpinene, cineol, terpineolene | 234 | 23.4 |
| 3 | Terpineol | 623 | 62.3 |
| 4 | Residue | 75 | 7.5 |
| | | | 106.0 |

The percentage figures given in this example and in those which follow are on the basis of the original weight of turpentine or pinene used. It will be noted that the total, on this basis, is greater than 100%, which is due to the amount of water added in hydrating.

As illustrative of the production of terpineol from alpha-pinene, for example, there are added from 1080 to 2000 parts of alpha-pinen, 1080 parts of 39% sulfuric acid and 420 parts of acetone. The reagents are agitated and suitably cooled to maintain the temperatures from about 35° C. to about 40° C. for a period of six hours. After neutralization and recovery of the acetone as described in the above example, the crude reaction product is fractionally distilled, yielding the following fractions:

| | | Parts | Percent |
|---|---|---|---|
| 1 | Unreacted pinene | Trace | |
| 2 | Dipentene, terpinene, terpinolene, cineol | 924 | 46.2 |
| 3 | Terpineol | 862 | 43.1 |
| 4 | Terpin hydrate | 176 | 8.8 |
| 5 | Residue (mainly terpin) | 56 | 2.8 |

The major portion of terpin hydrate remains dissolved in the acetone and dilute acid which are drained from the oils, unless specific efforts are made to recover it therefrom. It thus remains in the reaction cycle, but when the recovered acid is used to hydrate successive batches of turpentine or pinene, the terpin hydrate does not accumulate, because it is continually dehydrated to terpineol, cineol and hydrocarbons under the reaction conditions employed and thus purging of the terpin hydrate from the system is never required.

As further illustrative of the production of terpineol from turpentine, there are added to 2000 parts of turpentine, 610 parts of 70% benzene sulfonic acid, 825 parts of water and 800 parts of acetone. The reagents are agitated and suitably cooled to maintain the temperature from about 45° C. to about 50° C. for a period of nine hours. The acid mixture is allowed to settle and is drawn off. After neutralization of the oils and the recovery of acetone therefrom as above described, the crude oils are fractionated with the following yield:

| | | Parts | Percent |
|---|---|---|---|
| 1 | Unreacted turpentine, terpinene, cineol, terpinolene, dipentene | | |
| 2 | Terpineol | 689 | 34.5 |
| 3 | Residue | 854 | 42.7 |

Benzene sulfonic acid is an active hydrating catalyst in the presence of mutual solvents, such as, for example, acetone as shown above. In the absence of acetone, dilute benzene sulfonic acid hydrates pinene to terpin hydrate, yields as high as 58% having been obtained. In the presence of acetone, however, terpineol, the desired product, is the major hydration product.

As further illustrative of the production of terpineol from pinene, there are added to 428 parts of alpha-pinene, 350 parts of 35% sulfuric acid and 350 parts of dioxan. The reagents are agitated and suitably cooled to maintain the temperature from about 35° C. to about 40° C. for a period of 2 hours. The acid layer is then allowed to settle and is drawn off. After neutralization of the oils, they are subjected to fractional distillation with the following yields:

| | | Parts | Percent |
|---|---|---|---|
| 1 | Dioxan | 75 | |
| 2 | Terpene hydrocarbons and cineol | 185 | 43 |
| 3 | Terpineol | 210 | 49 |
| 4 | Residue (mainly terpin) | 26 | 6 |

As will be appreciated, the method in accordance with this invention may be readily carried out in any suitable form of apparatus, it being clear that no particular form of apparatus is necessary. Thus, any vessel suitable for holding the acid mixtures involved and equipped with a suitable stirring or agitating device as well as, for example, a jacket for cooling, will be found satisfactory.

For the distillation involved, any well known apparatus may be used or the vessel in which the reaction takes place may be equipped with suitable heating and condensing means.

In the practical adaptation of the method in accordance with this invention pinene or turpentine may be treated as above specified. Wherein the specification and claims I refer to pinene it will be understood that I refer to both alpha and beta-pinene or mixtures thereof and that turpentine may be substituted therefor and be the equivalent thereof. It will be understood that pinene as such or any terpene fraction rich in pinene may be employed as a starting material for my reaction.

It will be understood that the method in accordance with this invention contemplates broadly the production of terpineol from pinene or turpentine by the treatment of pinene or turpentine with a dilute aqueous polybasic non-carboxylic acid or a monoaryl or monoalkyl derivative thereof in the presence of a mutual non-reactive solvent. Furthermore, it will be understood that the examples are by way of illustration only and that the scope of this invention is not limited thereto.

What I claim and desire to protect by Letters Patent is:

1. A process for producing terpineol from pinene which includes treating pinene with a dilute aqueous acid from the group consisting of polybasic non-carboxylic acids and the monoaryl and monoalkyl derivatives thereof in the presence of an organic liquid which is miscible with both the pinene and the said acid and non-reactive therewith.

2. A process for producing terpineol from pinene which includes treating pinene at a slightly elevated temperature with a dilute aqueous acid from the group consisting of polybasic non-carboxylic acids and the monoaryl and monoalkyl derivatives thereof in the presence of an organic liquid which is miscible with both the pinene and the said acid and non-reactive therewith at the temperature of reaction.

3. A process for producing terpineol from pinene which includes treating pinene at a temperature not above 60° C. with a dilute aqueous acid from the group consisting of polybasic non-carboxylic acids and the monoaryl and monoalkyl derivatives thereof in the presence of an organic liquid which is miscible with both the pinene and the said acid and non-reactive therewith at the temperature of reaction.

4. A process for producing terpineol from pinene which includes reacting pinene with water at a temperature not above 60° C. in the presence of a dilute aqueous acid from the group consisting of polybasic non-carboxylic acids and the monoaryl and monoalkyl derivatives thereof and an organic liquid which is miscible with both the pinene and the said acid and non-reactive therewith at the temperature of reaction.

5. A process for producing terpineol from pinene which includes treating pinene at a temperature from about 35° C. to about 45° C. with a dilute aqueous acid from the group consisting of polybasic non-carboxylic acids and the monoaryl and monoalkyl derivatives thereof and an organic liquid which is miscible with both the pinene and the said acid and non-reactive therewith at the temperature of reaction.

6. A process for producing terpineol from pinene which includes treating pinene with a dilute aqueous acid from the group consisting of polybasic non-carboxylic acids and the monoaryl and monoalkyl derivatives thereof having an acid concentration from about 25% to about 45% in the presence of an organic liquid which is miscible with both the pinene and the said acid and non-reactive therewith.

7. A process for producing terpineol from pinene which includes treating pinene with sulfuric acid having an acid concentration from about 25% to about 45% in the presence of an organic liquid which is miscible with both the pinene and the said acid and non-reactive therewith.

8. A process as in claim 7, the sulphuric acid being replaced by benzene sulphonic acid.

9. A process for producing terpineol from pinene which includes treating pinene with sulphuric acid having an acid concentration from about 25% to about 45%, in the presence of acetone.

10. A process as in claim 9, the sulphuric acid being replaced by benzene sulphonic acid.

11. A process for producing terpineol from pinene which includes treating pinene with a dilute aqueous acid from the group consisting of polybasic non-carboxylic acids and the monoaryl and monoalkyl derivatives thereof in the presence of an organic liquid which is miscible with both the pinene and the said acid and non-reactive therewith, separating from the oil the acid mixture containing part of the said organic liquid, recovering the remainder of said orgnanic liquid from the oil and fractionating the oil to recover terpineol.

12. A process for producing terpineol from a terpene fraction rich in pinene which includes treating said terpene fraction with a dilute aqueous acid from the group consisting of polybasic non-carboxylic acids and the monoaryl and monoalkyl derivatives thereof in the presence of an organic liquid which is miscible with both the said terpene fraction and the said acid and non-reactive therewith.

13. A process for producing terpineol from turpentine which includes treating turpentine with a dilute aqueous acid from the group consisting of polybasic non-carboxylic acids and the monoaryl and monoalkyl derivatives thereof in the presence of an organic liquid which is miscible with both the turpentine and the said acid and non-reactive therewith.

14. A process for producing terpineol from turpentine which includes treating turpentine at a temperature not above 60° C. with a dilute aqueous acid from the group consisting of polybasic non-carboxylic acids and the monoaryl and monoalkyl derivatives thereof in the presence of an organic liquid which is miscible with both the turpentine and the said acid and non-reactive therewith at the temperature of reaction.

15. A process for producing terpineol from turpentine which includes reacting turpentine with water at a temperature not above 60° C in the presence of a dilute equeous acid from the group consisting of polybasic non-carboxylic acids and the monoaryl and monoalkyl derivatives thereof an an organic liquid which is miscible with both the turpentine and the said acid and non-reactive therewith at the temperature of reaction.

16. A process for producing terpineol from turpentine which includes treating turpentine at a temperature from about 35° C. to about 45° C. with a dilute aqueous acid from the group consisting of polybasic non-carboxylic acids and the monoaryl and monoalkyl derivatives thereof and an organic liquid which is miscible with both the turpentine and the said acid and non-reactive therewith at the temperature of reaction.

17. A process for producing terpineol from turpentine which includes treating turpentine with a dilute aqueous acid from the group consisting a dilute aqueous acid from the group consisting of polybasic non-carboxylic acids and the monoaryl and monoalkyl derivatives thereof having an acid concentration from about 25% to about 45% in the presence of an organic liquid which is miscible with both the turpentine and the said acid and non-reactive therewith.

18. A process for producing terpineol from turpentine which includes treating turpentine with sulphuric acid having an acid concentration from about 25% to about 45% in the presence of an organic liquid which is miscible with both the turpentine and the said acid and non-reactive therewith.

19. A process for producing terpineol from turpentine which includes treating turpentine with sulphuric acid having an acid concentration from about 25% to about 45% in the presence of acetone.

20. A process for producing terpineol from turpentine which includes treating turpentine with a dilute aqueous acid from the group consisting of polybasic non-carboxylic acids and the monoaryl and monoalkyl derivatives thereof in the presence of an organic liquid which is miscible with both the turpentine and the said acid and non-reactive therewith, separating from the oil the acid mixture containing part of the said organic liquid, recovering the remainder of said organic liquid from the oil and fractionating the oil to recover terpineol.

DONALD H. SHEFFIELD.